April 9, 1935.  E. E. LONGFELLOW  1,997,466
SURGICAL APPLIANCE
Filed April 23, 1934
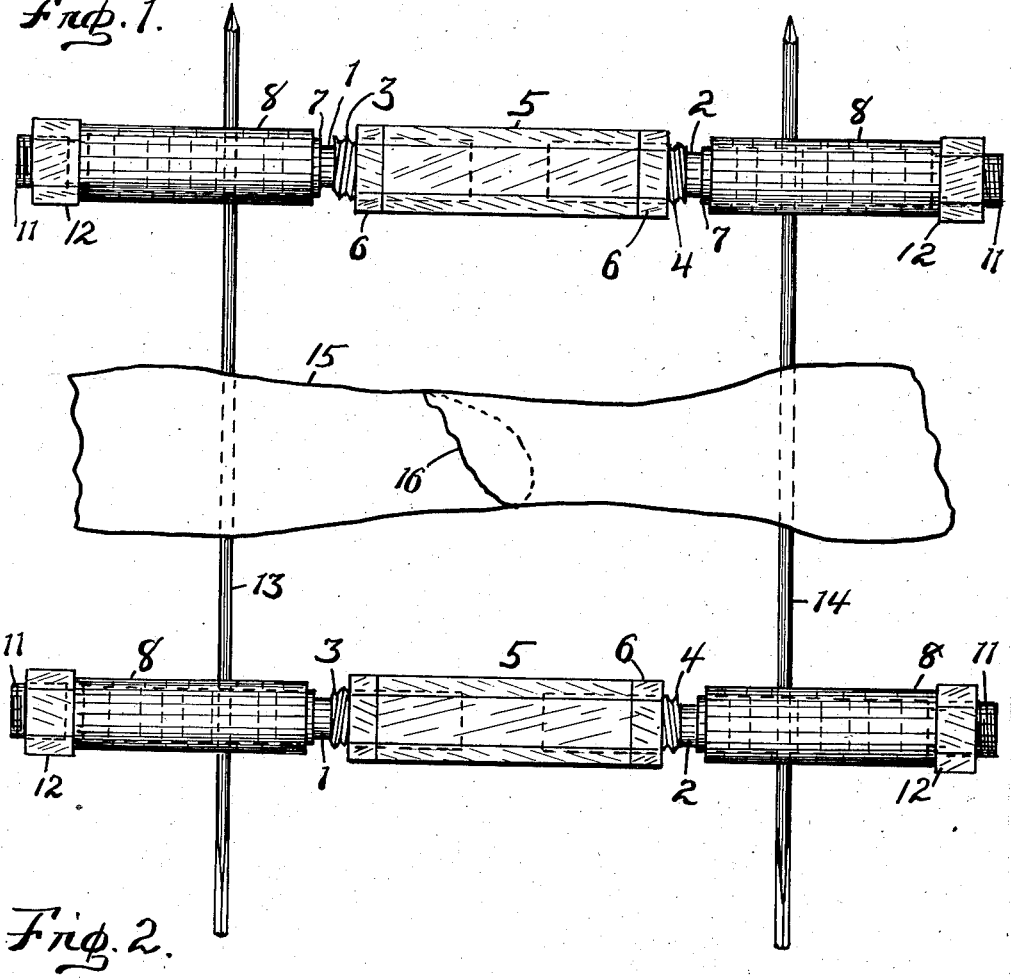
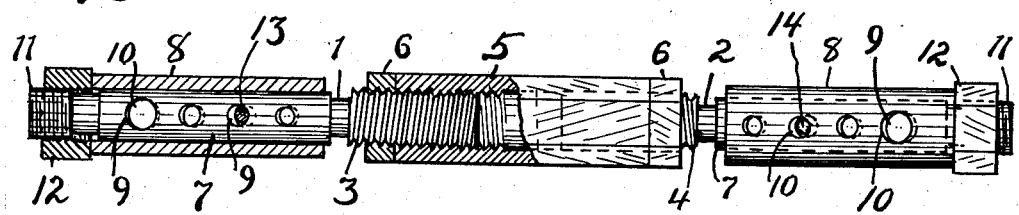
Earl E. Longfellow INVENTOR.
BY
H. G. Burns ATTORNEY.

Patented Apr. 9, 1935

1,997,466

UNITED STATES PATENT OFFICE 1,997,466

SURGICAL APPLIANCE

Earl E. Longfellow, Warsaw, Ind., assignor to Harry Herschel Leiter, Warsaw, Ind.

Application April 23, 1934, Serial No. 721,917

2 Claims. (Cl. 128—92)

This invention relates to improvements in surgical appliances. The object of the improvement is to afford an appliance for the adjustment and fixation of the parts of broken bones in a living being and to sustain said parts in a state of fixation temporarily after replacement in their normal relative positions to thereby facilitate subsequent apposition. Other objects and advantages of the invention will appear in the following description.

An illustrative embodiment of the invention is shown in the accompanying drawing, in which:—

Fig. 1 is a top plan view of the appliance with a fractured bone secured thereby; and Fig. 2 is a side elevation projected from Fig. 1, a portion thereof being in section.

The illustrative embodiment of the invention preferably consists of a pair of extensible anchors arranged in conjunction with a pair of skeletal pins applicable to a fractured limb to secure the parts of broken bones, in a state of fixation upon adjustment thereof.

Each anchor has a pair of axially alined shafts 1 and 2, the adjacent end portions of which have formed thereon respectively left and right hand external threads 3 and 4 and extend into the corresponding internally threaded ends of a turnbuckle 5 so that upon rotation of said turnbuckle relative to the shafts movement of said shafts toward or from each other adjustably is effected. Jam-nuts 6 disposed on the threaded portions of said shafts are provided which when tightened against the corresponding ends of the turnbuckle secure said shafts in their adjusted positions.

The outer end portion 7 of each shaft has thereon a sliding tubular sleeve 8 and has made therein a series of transversely disposed openings 9 preferably of different sizes, and said sleeve has perforations 10 in its opposite sides that correspond with the openings in the shaft. The outer end of each shaft has a threaded extension 11 having thereon a nut 12 that bears against the corresponding end of the sleeve 8 and upon manipulation of the nut the sleeve is moved adjustably lengthwise on the shaft so that when a skeletal pin 13—14 is inserted through an opening 9 in the shaft and the corresponding perforations 10 in the sleeve it is clamped in connection with the shaft upon tightening of the nut against the outer end of the sleeve and is thereby held firmly in place in the anchor.

In use, one of the skeletal pins (13) is inserted through the injured limb so as to penetrate the bone 15 thereof at a point suitably spaced from the point of fracture 16 thereof with its opposite ends protruding from the overlying flesh (not shown) about the bone. The other skeletal pin (14) is similarly inserted through the limb so as to penetrate the bone at a point suitably spaced from the point of fracture 16 oppositely with respect to the former pin (13) and preferably so as to extend in parallel relation therewith when the parts of the broken bone are properly adjusted together.

The protruding ends of the pins are secured in the corresponding anchors firmly by tightening the nuts 12 on said extensions so that the pins are clamped in place in connection with the shafts by said sleeves. By manipulating the turnbuckles 5 and securing them in adjusted positions in their shafts by tightening the jam-nuts 6, the pins are moved toward or from each other and secured as may be required to hold the parts of the fractured bone in proper juxtaposition.

When the fracture is thus reduced and held in place by the appliance a cast of plaster or other suitable surgical expedient (not shown) is applied so as to encase the fractured limb about the fracture and adjacent portions of the protruding pins, and in this manner insure fixation of the bone parts. The anchors are subsequently removed from the pins at such time as the surgeon may determine.

The appliance as constructed affords opportunity for the exercise of more or less surgical skill in its adaptation. For instance, after one of the pins has been applied in place to the injured limb, one of the anchors may be secured to the rear end portion of the pin so that the opposite end of the anchor serves as a guide for the other pin as it is applied through the corresponding shaft to the limb, thus insuring proper parallelism of the pins when finally secured in place.

I claim:—

1. A surgical appliance comprising a pair of adjustably extensible anchors, each being provided in its end portions with a series of openings transversely disposed, axially movable sleeves on said end portions having perforations in their sides complemental to the corresponding openings in said end portions, nuts threaded on the outer ends of said end portions engageable with the corresponding sleeves for effecting axial movement thereof in said end portions, and skeletal pins inserted selectively through the openings in the end portions of said anchor and the corresponding perforations in said sleeves to be secured thereby in place with respect to said anchors upon tightening of said nuts against said sleeves.

2. In a surgical appliance, an anchor for securing skeletal pins that are inserted transversely through the parts of a fractured limb at points spaced apart, said anchor having a pair of axially alined shafts the inner end portions of which have formed respectively thereon left and right hand external threads, a turnbuckle having threaded connections respectively with the inner end portions of said shafts, jam-nuts on said threaded portions acting against the corresponding end of said turnbuckle to secure said shafts in adjusted positions relative thereto, the outer end portions of said shafts having transversely disposed needle-receiving openings therein, sleeves axially slidable on the outer end portions of said shafts provided with perforations in their sides complemental to said openings, and means on said shafts for axially moving the corresponding sleeves adjustably so that pins inserted through said openings and perforations are thereby clamped in connection with said anchor.

EARL E. LONGFELLOW.